United States Patent
Yi et al.

(10) Patent No.: US 9,265,018 B2
(45) Date of Patent: *Feb. 16, 2016

(54) METHOD AND APPARATUS FOR MANAGING UPLINK TIME ALIGNMENT

(75) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

This patent is subject to a terminal disclaimer.

(21) Appl. No.: 13/978,081
(22) PCT Filed: Mar. 8, 2012
(86) PCT No.: PCT/KR2012/001680
§ 371 (c)(1),
(2), (4) Date: Jul. 2, 2013
(87) PCT Pub. No.: WO2012/134072
PCT Pub. Date: Oct. 4, 2012

(65) Prior Publication Data
US 2013/0279493 A1  Oct. 24, 2013

Related U.S. Application Data

(60) Provisional application No. 61/469,072, filed on Mar. 29, 2011.

(30) Foreign Application Priority Data

Feb. 6, 2012 (KR) .......................... 10-2012-0011722

(51) Int. Cl.
*H04W 56/00* (2009.01)
*H04W 74/00* (2009.01)
(Continued)

(52) U.S. Cl.
CPC .......... *H04W 56/00* (2013.01); *H04W 56/0005* (2013.01); *H04W 56/0045* (2013.01);
(Continued)

(58) Field of Classification Search
CPC ............ H04J 3/0676; H04M 2242/40; H04N 21/242; H04L 41/028; H04L 1/0061; H04L 1/0083; H04L 2201/00; H04L 2203/00; H04L 12/413; H04W 74/08; H04W 56/00; H04W 56/0005; H04W 56/0045; H04W 74/004; H04W 74/006; H04W 74/0833; H04W 92/10; H04W 74/04; H04W 72/12; H04W 74/0808; G05B 2219/31213; G05B 2219/31187
USPC ......... 370/324, 350, 503, 338, 437, 447, 445, 370/458–459, 461–462; 455/51.5, 502, 455/524–525, 450, 451, 452.1, 464
See application file for complete search history.

(56) References Cited

U.S. PATENT DOCUMENTS 7,933,243 B2 *  4/2011  Yi et al. ........................ 370/329
8,665,838 B2 *  3/2014  Chun et al. .................... 370/336
(Continued)

FOREIGN PATENT DOCUMENTS

EP  2 101 538 A2  9/2009
EP  2 274 948  1/2011
(Continued)

*Primary Examiner* — Charles C Jiang
*Assistant Examiner* — Mohamed Kamara
(74) *Attorney, Agent, or Firm* — Birch, Stewart, Kolasch & Birch, LLP

(57) ABSTRACT

A method and apparatus of managing uplink time alignment in a wireless communication system is provided. A user equipment transmits a random access preamble to maintain an uplink time alignment to a base station and receives a random access response in response to the random access preamble from the base station.

8 Claims, 3 Drawing Sheets

(51) Int. Cl.
*H04W 74/08* (2009.01)
*H04W 92/10* (2009.01)

(52) U.S. Cl.
CPC ........... *H04W74/004* (2013.01); *H04W 74/006* (2013.01); *H04W 74/0833* (2013.01); *H04W 92/10* (2013.01)

(56) References Cited

U.S. PATENT DOCUMENTS

2009/0279495 A1    11/2009   Yoo

| | | |
|---|---|---|
| 2010/0177747 A1 | 7/2010 | Chun et al. |
| 2010/0284376 A1 | 11/2010 | Park et al. |
| 2011/0002405 A1* | 1/2011 | Raveendran .................. 375/260 |
| 2011/0170535 A1* | 7/2011 | Wang et al. .................. 370/350 |

FOREIGN PATENT DOCUMENTS

| KR | 10-2009-0052822 A | 5/2009 |
| KR | 10-2009-0076805 A | 7/2009 |
| KR | 10-2009-0116590 A | 11/2009 |

* cited by examiner (A)

(B)

METHOD AND APPARATUS FOR MANAGING UPLINK TIME ALIGNMENT

CROSS REFERENCE TO RELATED APPLICATIONS

This application is the National Phase of PCT/KR2012/001680 filed on Mar. 8, 2012, which claims priority under 35 U.S.C. 119(e) to U.S. Provisional Application No. 61/469,072 filed on Mar. 29, 2011 and under 35 U.S.C. 119(a) to Patent Application No. 10-2012-0011722 filed in Republic of Korea on Feb. 6, 2012, all of which are hereby expressly incorporated by reference into the present application.

TECHNICAL FIELD

The present invention relates to wireless communications, and more particularly, to a method and apparatus for managing uplink time alignment in a wireless communication system.

BACKGROUND ART rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

An LTE system based on an orthogonal frequency division multiplexing (OFDM) technique has a possibility that an interference to another user occurs in a process of performing communication between a user equipment (UE) and a base station (BS). In order to minimize the interference, it is very important for the BS to manage uplink transmission timing of the UE. Therefore, the BS properly regulates the uplink transmission timing of the UE according to a situation of the UE, and such a regulation is called management of uplink time alignment.

Since the UE does not always exist in a fixed location, the transmission timing of the UE varies depending on a speed and location of the moving UE. By considering this, the UE assumes that the uplink time alignment is valid only during a specific time period even if the uplink time alignment is set. A timer used for this is a time alignment timer (TAT).

The TAT is used to control how long the UE maintains the uplink time alignment.

The UE uses various applications. One application may need to always maintain the uplink alignment, whereas another application may no longer need to maintain the uplink alignment due to temporary uplink transmission.

Although the application used by the UE has various features, whether to maintain an uplink synchronized state of the UE is determined entirely by the BS in the LTE system.

There is a need to determine whether to maintain the uplink time alignment according to the situation of the UE.

DISCLOSURE OF INVENTION

Technical Problem

The present invention provides a method and apparatus for managing uplink time alignment in a wireless communication system.

Solution to Problem

In an aspect, a method of managing uplink time alignment in a wireless communication system is provided. The method includes transmitting a random access preamble to maintain an uplink time alignment to a base station, and receiving a random access response in response to the random access preamble from the base station.

The method may further include starting a time alignment timer which is used to control how long the user equipment is considered uplink time aligned.

In another aspect, a user equipment for managing uplink time alignment in a wireless communication system includes a radio frequency unit for receiving a radio signal, and a processor, operatively coupled with the radio frequency unit, configured to transmit a random access preamble to maintain an uplink time alignment to a base station, and receive a random access response in response to the random access preamble from the base station.

Advantageous Effects of Invention

A user equipment can autonomously perform a random access procedure when it is determined that uplink time alignment is required. Therefore, an application that needs to always maintain the uplink time alignment can be effectively supported.

MODE FOR THE INVENTION

Figure 1:
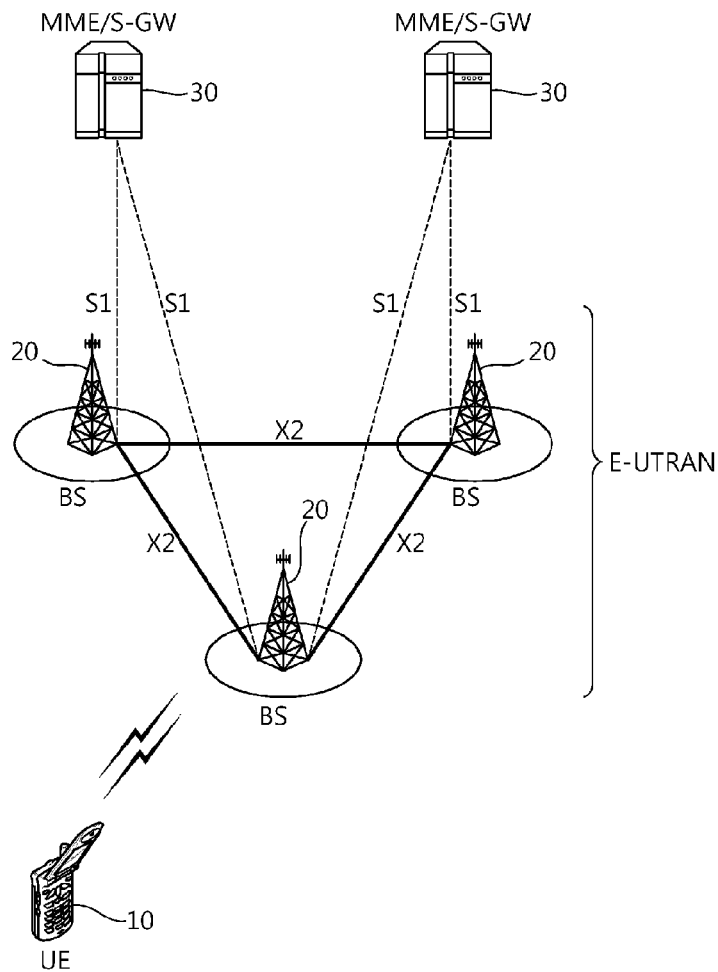
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
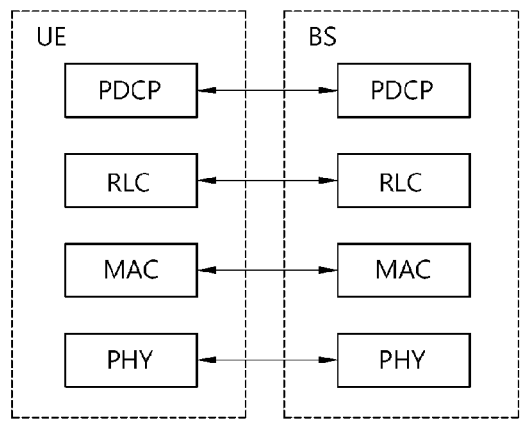
FIG. 2 is a diagram showing a radio protocol architecture for a user plane.
Figure 3:
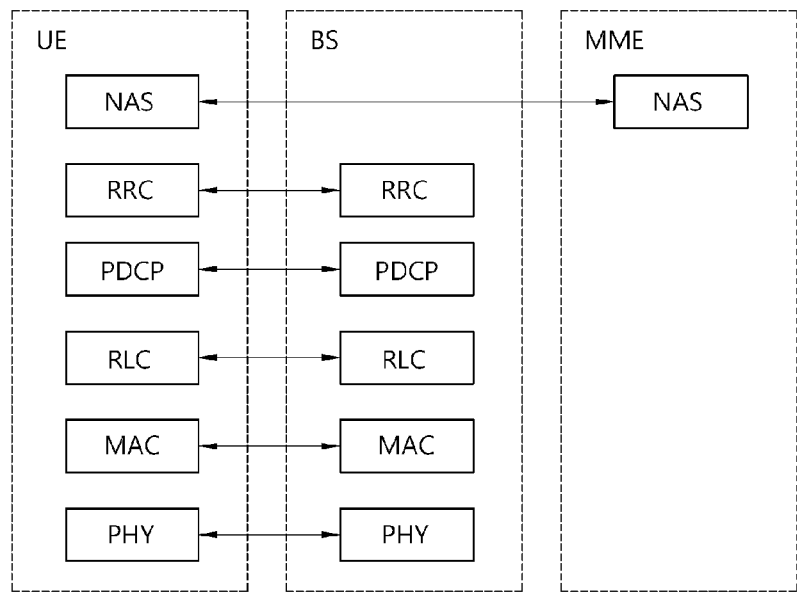
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Now, uplink timing synchronization will be described.

An LTE system based on an orthogonal frequency division multiplexing (OFDM) technique has a possibility that an interference to another user occurs in a process of performing communication between a UE and a BS. In order to minimize the interference, it is very important for the BS to manage uplink transmission timing of the UE.

The UE can be located in any region within a cell. This implies that an arrival time of uplink data delivered to the BS may differ depending on a location of each UE. For example, an arrival time of the data of a UE located in a cell boundary may be longer than an arrival time of uplink data of a UE located in a cell center.

In order for the BS to decrease interference between UEs, the BS needs to be able to receive uplink data transmitted by all UEs in a cell in a specific time domain. Therefore, the BS properly regulates the uplink transmission timing of the UE according to a situation of the UE, and such a regulation is called management of uplink time alignment.

The UE calculates a timing alignment value for advancing or delaying transmission timing of the UE by using information received from the BS. The timing alignment value is called a timing advance command (hereinafter, TAC). The UE updates transmission timing by applying the timing alignment value.

In another method, the BS receives a sounding reference signal (SRS) transmitted periodically or randomly, and calculates the TAC by using the SRS and then reports it to the UE through a MAC control element (CE). Accordingly, the UE updates its transmission timing.

Figure 4:
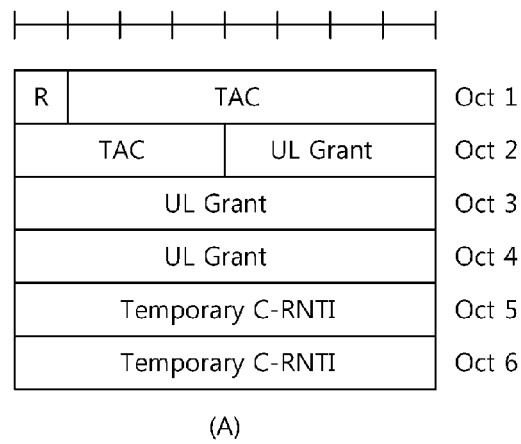
FIG. 4 shows an example of transmitting a timing advance command (TAC).
Figure 4:
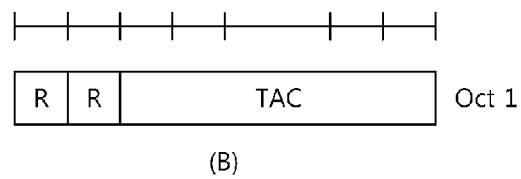

FIG. 4 shows an example of transmitting a TAC. The section 6 of 3GPP (3rd Generation Partnership Project) TS (Technical Specification) 36.321 V8.5.0 (2009-03) can be incorporated herein by reference. FIG. 4(A) shows a TAC included in a random access response. FIG. 4(B) shows a TAC included in a MAC CE.

When the TAC is included in the random access response, this is case where new alignment is performed in a state where a UE is not time-aligned. Therefore, a precise regulation is required, and an 11-bit TAC is transmitted. When the TAC is included in the MAC CE, this is a case where it is used to extend time alignment in a situation where the UE is time-aligned, and thus a 6-bit TAC is transmitted.

However, since the UE does not always exist in a fixed location, transmission timing of the UE varies depending on a speed and location of the moving UE. By considering this, the UE assumes that time alignment is valid only during a specific time after receiving the TAC from a BS. A timer used for this is a time alignment timer (TAT).

The TAT is used to control how long the UE maintains the uplink time alignment.

Upon receiving the TAC from the BS, the UE applies the TAC and thereafter starts or restarts the TAT. The UE assumes that uplink time alignment with the BS is established only during the TAT is running.

A value of the TAT can be delivered by the BS to the UE through an RRC message such as system information or radio bearer reconfiguration.

If the UE receives a new TAC from the BS while the TAT is running, the UE can correct its uplink alignment timing by the TAC, and can restart the TAT. In addition, when the TAT expires or does not operate, the UE assumes that uplink time alignment is not established with the BS, and does not transmission any uplink data or control information (e.g., PUSCH and PUCCH) other than a random access preamble.

The UE uses various applications. One application may need to always maintain the uplink alignment, whereas another application may not need to always maintain the uplink alignment due to temporary uplink transmission.

Although the application used by the UE has various features, whether to maintain an uplink synchronized state of the UE is determined entirely by the BS in the conventional technique.

If the application needs to always maintain uplink alignment, the UE has to maintain an uplink synchronized state always. However, since the BS sets the TAT value of the UE in the conventional technique, if an inactivity period of the UE is longer than the set TAT value, the TAT expires during the inactivity period and thus the UE changes to an uplink timing unsynchronized state.

The uplink timing unsynchronized state refers to a state in which the TAT does not operate, and the uplink timing synchronized state refers to a state in which the TAT operates.

According to the conventional technique, the TAT operates on the basis of a configuration of the BS, and thus the UE cannot take any action to extend an operation of the TAT.

The present invention proposes a new random access triggering condition which allows attempting to perform a random access procedure when a UE desires to receive a TAC from a BS.

According to the present invention, the random access procedure is triggered in a limited situation such as when a command is received from the BS or when there is no uplink radio resource for uplink data transmission, and it is impossible for the UE to attempt the random access procedure to receive the TAC.

According to the proposed invention, when the UE desires to maintain uplink time alignment in a higher application or the like, it is allowed to attempt the random access procedure to the BS.

The UE transmits a random access preamble to the BS, and receives a random access response. The UE applies a TAC included in the random access response, and restarts a TAT. By restarting the TAT, uplink time alignment can be extended.

Figure 5:
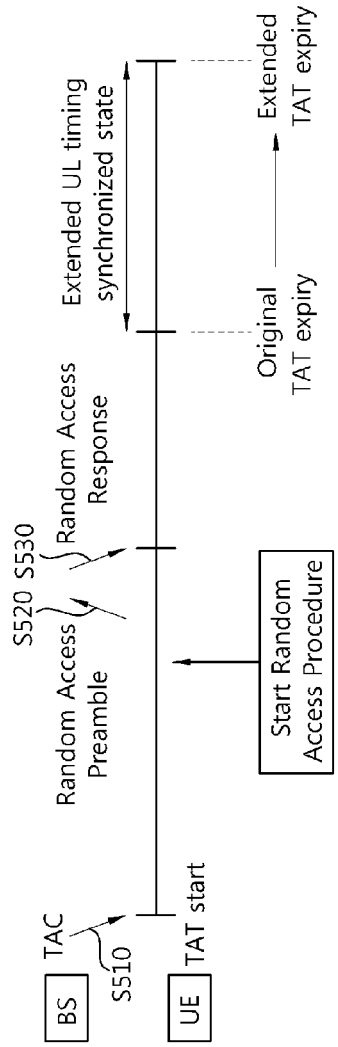
FIG. 5 shows a method of managing uplink time alignment according to an embodiment of the present invention.

FIG. 5 shows a method of managing uplink time alignment according to an embodiment of the present invention.

Upon receiving a TAC, a UE applies the TAC and starts a TAT (step S510). The starting of the TAT may include restarting of the TAT.

A MAC layer or RRC layer of the UE starts a random access procedure when there is a need to maintain uplink time alignment. When the random access procedure starts, the UE transmits the random access preamble to the BS (step S520).

The random access procedure for maintaining the uplink time alignment can start irrespective of whether there is a TAT currently running, whether there is uplink data to be transmitted, whether there is an uplink radio resource, etc. Where there is a need to maintain uplink time alignment can be autonomously determined by the MAC layer or the RRC layer and can be requested by the higher application. The request of the higher application is delivered to the MAC layer or the RRC layer.

While the TAT is running, triggering of the random access procedure for maintaining uplink time alignment can be prohibited. For example, a prohibition timer is set, and the random access procedure for maintaining the uplink time alignment dose not start while the prohibition timer is running. This is to prevent an uplink timing synchronized state between the UE and the BS from being changed due to the expiry of the TAT during the random access procedure. In addition, this is to provide a time in which the BS allocates an uplink radio resource to extend the uplink synchronized state of the UE. A prohibition timer value can be set to the UE by the BS or can be pre-defined.

A dedicated random access preamble for the random access procedure for maintaining the uplink time alignment can be allocated. If there is the dedicated random access preamble, the UE transmits a random access preamble. If there is no random access preamble, the UE randomly selects one preamble from a plurality of candidate random access preambles, and transmits the selected random access preamble.

Upon receiving the dedicated random access preamble from the UE, the BS can determine whether to maintain uplink time alignment of the UE, and if it is determined to maintain the uplink time alignment, can transmit a random access response to the UE. If it is determined not to maintain the uplink time alignment, the BS may not transmit the random access response to the UE.

If the BS receives the randomly selected random access preamble from the UE, the BS cannot know why the UE starts the random access procedure. Therefore, the BS can transmit a normal random access response to the UE.

The UE can receive a random access response from the BS in response to the random access preamble (step S530). The random access response includes a TAC. The UE can apply the TAC, and can re-start a TAT.

If it is determined that the uplink time alignment needs to be maintained, the UE can autonomously perform the random access procedure. Therefore, an application that needs to always maintain the uplink time alignment can be effectively supported.

Figure 6:
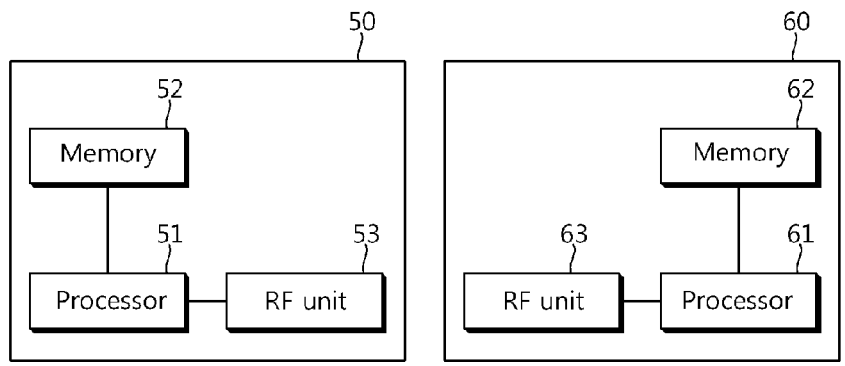
FIG. 6 is a block diagram showing a wireless communication system according to an embodiment of the present invention.

FIG. 6 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the embodiment of FIG. 5, the operation of the BS can be implemented by the processor 51.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the embodiment of FIG. 5, the operation of the BS can be implemented by the processor 61.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of managing uplink time alignment in a wireless communication system, performed by a user equipment, the method comprising:
   transmitting a random access preamble to maintain an uplink time alignment to a base station; and
   receiving a random access response in response to the random access preamble from the base station,
   wherein the random access preamble is a dedicated random access preamble used by the base station to determine whether to maintain the uplink time alignment,
   wherein the random access preamble is transmitted while a prohibition timer is not running, and
   wherein the prohibition timer is used to indicate a specific time period for prohibiting a triggering of a random access procedure to maintain the uplink time alignment.

2. The method of claim 1, further comprising:
   starting a time alignment timer which is used to control how long the user equipment is considered uplink time aligned.

3. The method of claim 2, wherein the random access preamble is transmitted while the time alignment timer is running.

4. The method of claim 2, further comprising:
   applying a timing advance command included in the random access response; and
   restarting the time alignment timer upon receiving the random access response.

5. A user equipment for managing uplink time alignment in a wireless communication system, the user equipment comprising:
   a radio frequency unit configured to receive a radio signal; and
   a processor, operatively coupled with the radio frequency unit and configured to:
      transmit a random access preamble to maintain an uplink time alignment to a base station; and
      receive a random access response in response to the random access preamble from the base station,
      wherein the random access preamble is a dedicated random access preamble used by the base station to determine whether to maintain the uplink time alignment,
      wherein the random access preamble is transmitted while a prohibition timer is not running, and
      wherein the prohibition timer is used to indicate a specific time period for prohibiting a triggering of a random access procedure to maintain the uplink time alignment.

6. The user equipment of claim 5, wherein the processor is further configured to start a time alignment timer which is used to control how long the user equipment is considered uplink time aligned.

7. The user equipment of claim 6, wherein the random access preamble is transmitted while the time alignment timer is running.

8. The user equipment of claim 6, wherein the processor is further configured to:
   apply a timing advance command included in the random access response; and
   restart the time alignment timer upon receiving the random access response.

* * * * *